Nov. 12, 1957 H. F. BOK ET AL 2,812,885
PRESSURE LUBRICATOR
Filed Nov. 9, 1954 2 Sheets-Sheet 1

United States Patent Office 2,812,885
Patented Nov. 12, 1957

2,812,885
PRESSURE LUBRICATOR

Hendrik Frederik Bok, Valkenswaard, and Edward Bok, Amsterdam, Netherlands

Application November 9, 1954, Serial No. 467,868

Claims priority, application Netherlands November 11, 1953

17 Claims. (Cl. 222—394)

This invention relates to pressure lubricators, grease guns and similar devices.

The primary object of the invention is to provide a pressure lubricator or grease gun which can be cheaply manufactured, has very small dimensions and can be easily manipulated.

Another object of the invention is to provide a pressure lubricator or grease gun of simple construction, by means of which the lubricant can be pressed to the lubrication points, e. g. the lubrication nipples of a motorcar, at unusually high pressures, e. g. of the order of 50–800 atm.

A further object of the invention is to provide a pressure lubricator or grease gun in which these high pressures are generated by the evaporation of easily vaporized media, e. g. light hydrocarbons, such as gasoline and the like, by means of an electric resistor placed in the pressure vessel in direct contact with said media.

A further object of the invention is the provision of a pressure lubricator in which the lubricant itself, e. g. lubricating grease, lubricating oil and the like can be used as an evaporating medium in the pressure vessel.

A still further object of the invention is the provision of a pressure lubricator in which the resistor is placed in a water column and the generated steam pressure in the pressure vessel is used to press the lubricant by means of the water column out of the lubricator.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of the claims, without departing from the spirit of the invention.

Referring to the drawing.

Figure 1:
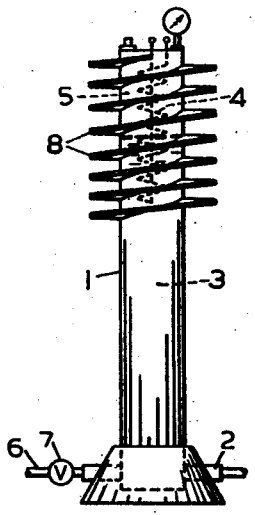
Figure 1 shows a high-pressure lubricator according to the invention with one pressure vessel.

In Figure 1, the pressure vessel is indicated by 1, which vessel can be filled through an inlet 2 with a column 3 of a lubricant, e. g. grease or lubricating oil, in such manner, that an electric resistor 4 centrally placed in the vessel is at least partially immersed in the lubricant column in direct contact with the lubricant. When the resistor is connected to the source of current, the lubricant will evaporate and in the space 5 above the lubricant level gas pressures of the order of 50–600 atm. will be generated, which, when the valve 7 is opened, will press the lubricant column through the outlet 6 to the lubrication point.

The upper part of the pressure vessel 1 may be provided with cooling ribs 8, in order to obtain a temperature stabilisation between the electric heat supplied and the heat radiation of the wall of the vessel during the operation of the device.

Figure 2:
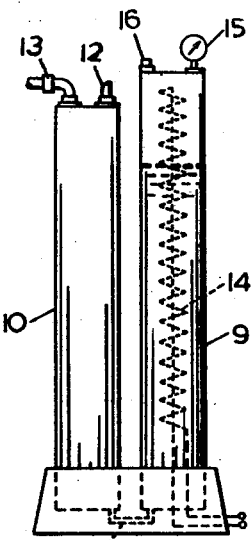
Figure 2 shows a high-pressure lubricator with two pressure vessels.

In the embodiment according to Figure 2, two pressure vessels 9 and 10 are interconnected at their lower ends by means of a conduit 11. At its top end the vessel 10 is connected to a filling conduit 12 for the lubricant and to a connection 13 for the outlet tube of the lubricant.

By means of the filling conduit 12 the vessel 10 is totally filled and the vessel 9 is partly filled with the lubricant, e. g. grease. In the pressure vessel 9 an electric resistor 14 is centrally placed and immersed in the grease column along a part of its height. The grease vapours accumulate at high pressure in the chamber 14 provided with a pressure gauge for working pressures of e. g. 50–500 atm. and with a safety valve 16.

It will be obvious, that the vessel 9 in which the pressure is generated, may be filled with a medium other than that in the vessel 10 containing the lubricant, e. g. with an easily vaporized hydrocarbon.

Also in this embodiment the pressure vessel 9 containing the resistor may be provided with cooling ribs in the manner indicated in Figure 1.

Figure 3:
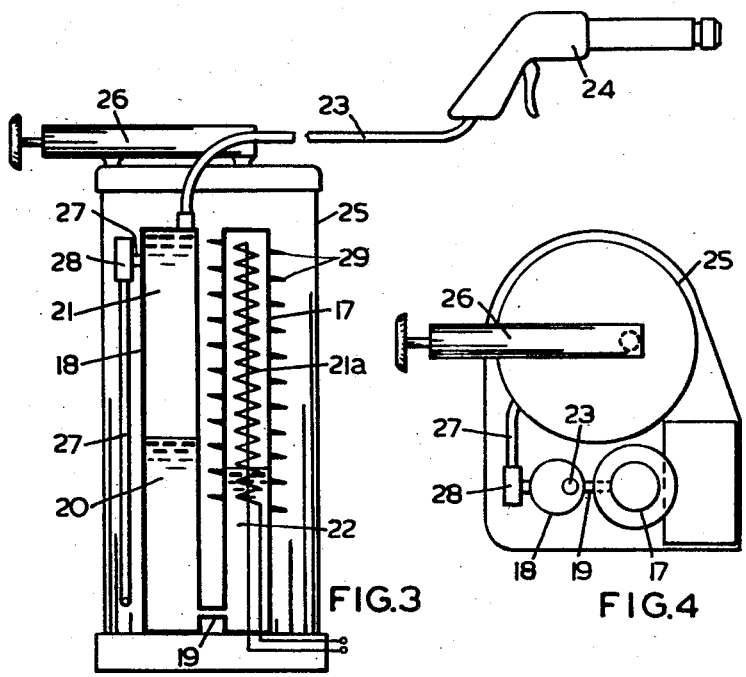
Figure 3 shows a high-pressure lubricator with two pressure vessels, in which water is used as an evaporating medium.
Figure 4:
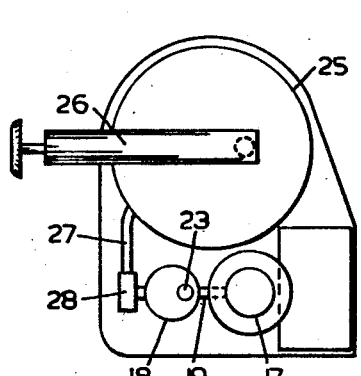
Figure 4 shows a plan view of the device according to Figure 3.

In the embodiment according to Figures 3 and 4, the two vertical pressure vessels 17 and 18 are connected by a conduit 19 at their lower ends. Both vessels are partially filled with water. In the vessel 18 a lubricant column 21 floats on the water column 20 in the vessel 18. The vessel 17 contains the electric resistor 21 partially immersed in the water column 22 in the vessel 17.

At the top side of the vessel 18 is connected the outlet-conduit 23 for the lubricant leading to a lubricating gun 24. The vessel 18 can be filled with lubricant from a container 25 placed beside the vessels 17 and 18. On the lubricant level in this container 25 a pressure can be generated by means of e. g. an air-pump 26, so that the lubricant is pressed through a conduit 27 provided with a valve 28 to the vessel 18.

The heated pressure vessel 17 is provided with cooling ribs 29.

By means of the steam-pressure generated in the vessel 17, through the medium of the water-column in both vessels 17 and 18 the grease is now pressed from the vessel 18 through the grease-outlet conduit 23 to the grease gun 24.

It will be obvious, that decomposition of the grease by the heating of the resistor is impossible with this embodiment and that the grease pressed to the lubrication points will remain at a low temperature.

Figure 5:
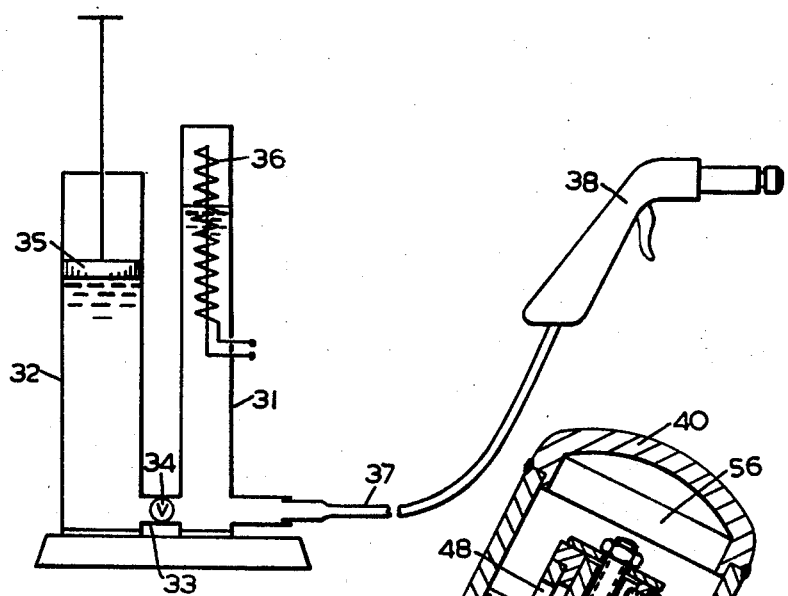
Figure 5 shows a lubricator with two pressure vessels, in which grease may be used as an evaporating medium.

In the embodiment according to Figure 5, both vessels 31 and 32 are interconnected by a conduit 33 provided with a cock 34.

Both vessels are filled with the lubricant, e. g. grease. When the cock 34 is opened, the vessel 31 can be filled by means of a piston 35 in the vessel 32.

After the cock 34 has been closed and the resistor 36 is connected to the current, the grease in the vessel 31 is pressed out by the pressure gases accumulated in the upper part of the vessel 31 and transported through a flexible tube 37 to the grease gun 38.

Figure 6:
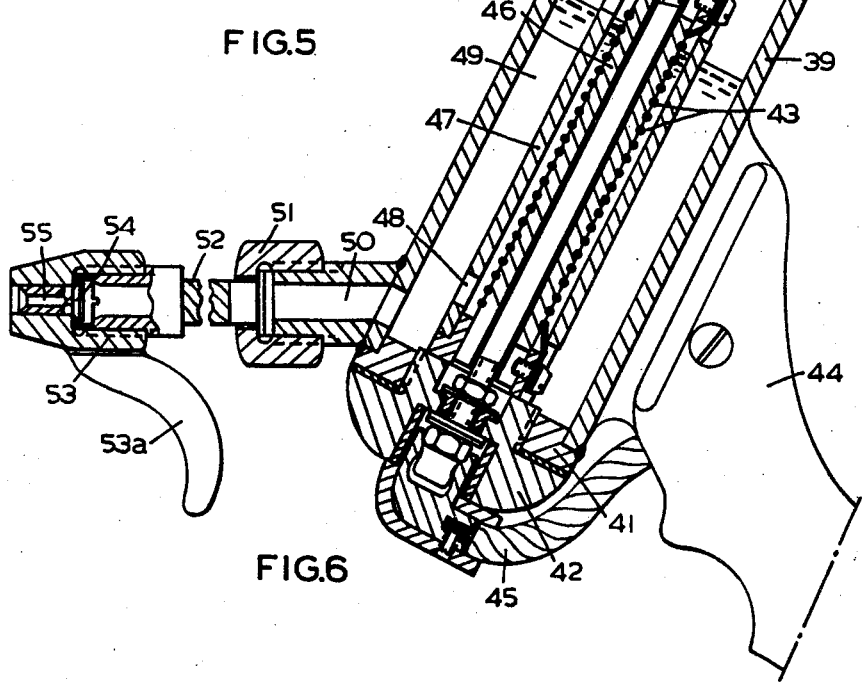
Figure 6 shows an embodiment of the invention formed as a grease-gun provided with a lubricating head.

According to the embodiment of Figure 6, the cylindrical pressure vessel 39 is provided with a welded cover 40 at its top end and with a welded connecting ring 41 at its lower side, in which ring is screwed a screw bottom 42 onto which the electric resistor 43 is fixed.

The pressure vessel 39 is provided with a hand grip 44 through which the electric wire 45 connected to the resistor 43 is passed. The resistor is wound around an insulated core 46 and at a small distance is surrounded by an insulating casing 47. The space between the resistor element 43 and core 46 and the casing 47 is closed at the top and is connected to the space 49 between the casing 47 and the wall of the pressure vessel 39 by means of holes 48.

To this space 49 an outlet conduit 50 for the lubricant is connected and is provided with a coupling nut 51 for the flexible tube 52 carrying the lubrication-head 53.

In this lubrication head 53, which is provided with a grip 53a, a valve 54 with pin 55 is arranged, which valve is opened when the lubrication head is placed on a lubrication nipple (not shown) of the devices to be lubricated.

As the resistor 43 is in direct contact with the medium and the quantity of this medium inside the casing 47 is rather small, when the resistor is connected to the source of current the pressure in the vessel 39 will rise very fast.

The vapors under pressure pass through the holes 48 into the gas chamber 56 and press the cool column of lubricant in the space 49 through the outlet 50 to the lubricating head 53.

It will be obvious, that the space between the resistor 43 and the casing 47 may be filled if desired with a volatile hydrocarbon, e. g. gasoline, and that the space 49 in the pressure vessel for instance may be filled with lubricating oil, lubricating grease or the like.

As the resistor 43 with appertaining parts is fixed to the screw-bottom 42, it can be easily removed from the pressure vessel 39 with said bottom, e. g. for filling the vessel or for repairing the resistor.

It will be obvious that the devices described may be used if desired for cleaning, when a cleaning fluid is used as the medium which is pressed out.

What we claim is:

1. A pressure lubricator comprising a closed pressure vessel filled with a lubricant column and with a column of an easily evaporating medium floating on said lubricant-column, an electric resistor placed in said vessel in direct contact with said evaporating medium column to vaporize said medium to form gases in said vessel above said columns, an outlet for said lubricant at the lower portion of said vessel, the gases at high pressure of at least 50 atm. accumulating above the fluid level of the evaporating medium pressing the lubricant through said outlet.

2. A pressure lubricator as claimed in claim 1, wherein the easily evaporating medium consists of a light hydrocarbon.

3. A pressure lubricator as claimed in claim 1, wherein said lubricant is a lubricating grease.

4. A pressure lubricator as claimed in claim 1, wherein said lubricant is a lubricating oil.

5. A pressure lubricator comprising two pressure vessels, a conduit connecting the two vessels at their lower ends, the first vessel being closed at its top end and being at least partially filled with an easily evaporating medium, an electric resistor in said first vessel directly contacting said evaporating medium, the second vessel being filled with a lubricant and at its top end being provided with a lubricant-outlet.

6. A pressure lubricator comprising two pressure vessels communicating at their lower ends and partially filled with water, the first vessel being closed at its top end and an electric resistor being placed in said vessel at least partially immersed into the water column in said vessel, the second vessel being filled with a lubricant on top of the water column in said vessel, said second vessel being provided with a lubricant-outlet at its top end.

7. A pressure lubricator as claimed in claim 6, further comprising a container filled with a lubricant, a filling conduit connecting said container with said second pressure vessel and means for generating a pressure above the lubricant level in said container for filling said second vessel with lubricant from said container.

8. A pressure lubricator comprising two pressure vessels at their lower ends interconnected by a conduit provided with a valve, both vessels being filled with a lubricant, the first vessel being closed at its top end and containing an electric resistor at least partially immersed in the lubricant-column in said vessel, the second vessel being provided with a piston on the lubricant level in said vessel.

9. A pressure lubricator comprising at least one pressure vessel partially filled with an easily evaporating medium, an electric resistor placed in said vessel in direct contact with said medium and cooling ribs provided on the outer surface of said pressure vessel.

10. A pressure lubricator comprising a pressure vessel at least partially filled with an easily evaporating medium, an electric resistor placed in said vessel in direct contact with said medium, said pressure vessel being resistant to inner pressures of at least 50 atm.

11. A pressure lubricator comprising a pressure vessel provided with a hand grip, an electric resistor centrally placed in said vessel, a heat-insulating casing closed at its top end and at a short distance surrounding said resistor, said casing being provided with holes communicating with the space between said casing and said pressure vessel.

12. A pressure lubricator as claimed in claim 11, wherein the resistor is fixed onto a removable bottom screwed into said pressure vessel.

13. A pressure lubricator as claimed in claim 12, further comprising an outlet for the lubricant connected to a flexible tube carrying a lubricating head.

14. A pressure lubricator as claimed in claim 13, wherein the lubricating head is provided with a valve closing under the pressure in the pressure vessel and adapted to be opened by pressing the pressure head on a lubricating nipple of the device to be lubricated.

15. A pressure lubricator comprising a closed vessel having a lubricant-containing section and an evaporating section adapted to be filled with an easily vaporized medium, an electric resistor disposed in said vessel for direct contact with said easily vaporized medium to vaporize said medium to form vapors thereof, an outlet for the lubricant, and a connection between the two sections positioned to lead the vapors at high pressure to the side of the lubricant away from said outlet to press the lubricant through said outlet.

16. A pressure lubricator as claimed in claim 15, wherein said easily vaporized medium consists of said lubricant.

17. A pressure lubricator as claimed in claim 15, wherein said easily vaporized medium consists of a light hydrocarbon.

References Cited in the file of this patent

UNITED STATES PATENTS

| | | |
|---|---|---|
| 1,456,327 | Monckton | May 22, 1923 |
| 1,910,053 | Rainey | May 23, 1933 |
| 1,964,298 | Nelson | June 26, 1934 |